United States Patent [19]

Pascal et al.

[11] Patent Number: 5,110,538
[45] Date of Patent: May 5, 1992

[54] PREHEATING STEAM GENERATOR

[75] Inventors: Yves Pascal, Nanterre; Gilles Dague, Paris, both of France

[73] Assignee: Framatome, Courbevoie, France

[21] Appl. No.: 497,583

[22] Filed: Mar. 22, 1990

[30] Foreign Application Priority Data

Mar. 22, 1989 [FR] France .................. 89 03750

[51] Int. Cl.⁵ .............................. G21C 15/14
[52] U.S. Cl. .............................. 376/402; 122/32
[58] Field of Search ............... 376/402, 299, 383; 122/32

[56] References Cited

U.S. PATENT DOCUMENTS 3,938,473  2/1976  Mayer et al. .................. 376/402
4,357,908  11/1982  Yazidjian ...................... 122/32

Primary Examiner—Brooks H. Hunt
Assistant Examiner—Frederick H. Voss
Attorney, Agent, or Firm—Pollock, Vande Sande & Priddy

[57] ABSTRACT

In a preheating steam generator, the feed water is distributed in a feed space (34) by inverted J-shaped tubes (50), so as to mix with the recirculation water passing out of the water-steam separators, which ensures the preheating of said feed water. In order to prevent the latter rising again above the upper edge (30a) of skirt (30) externally defining the space (34), use is made of one or more of the four procedures consisting of partly obstructing by a plate (52) the top of space (34), downwardly extending tube (50), increasing the diameter in the vicinity of their end and upwardly extending skirt (30).

11 Claims, 6 Drawing Sheets

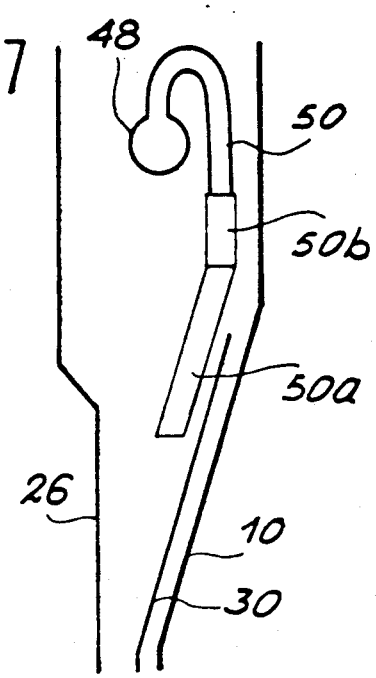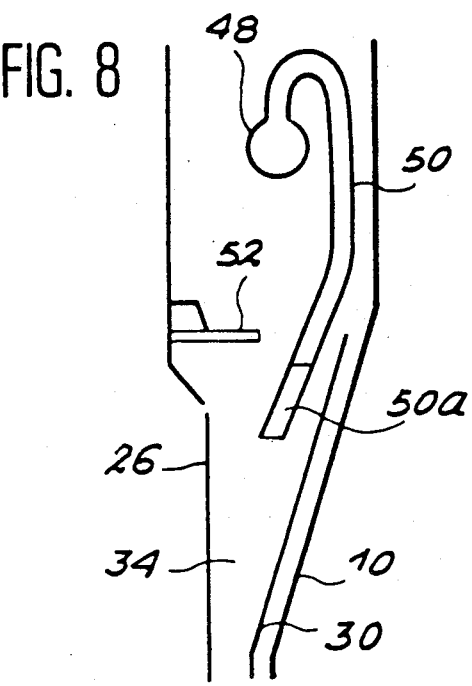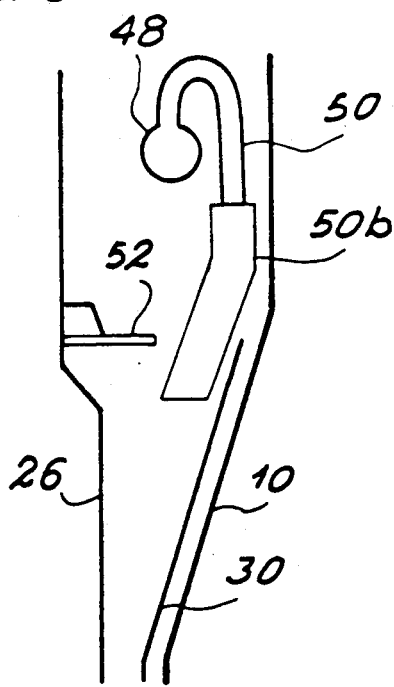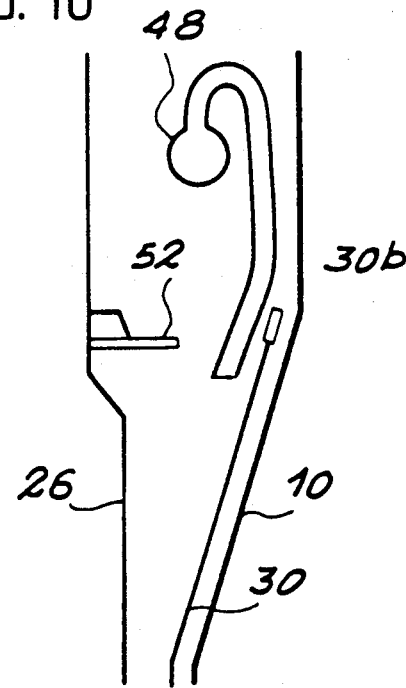

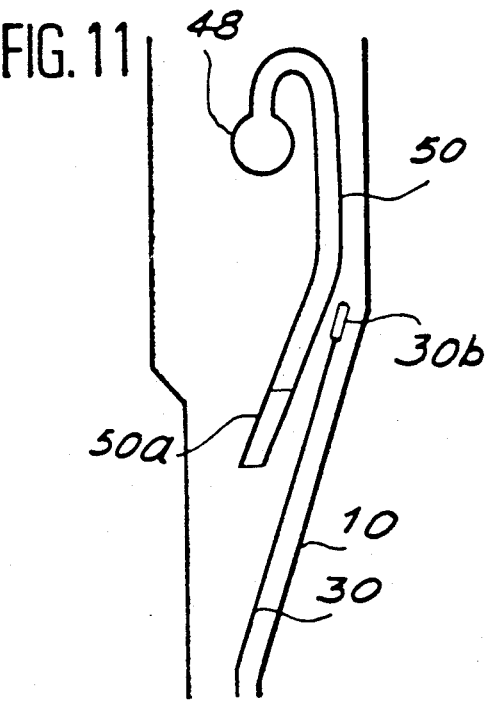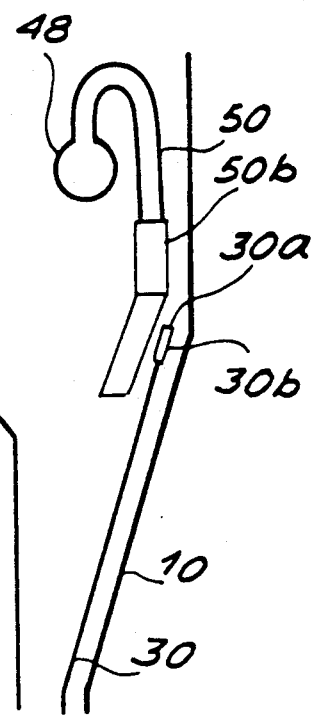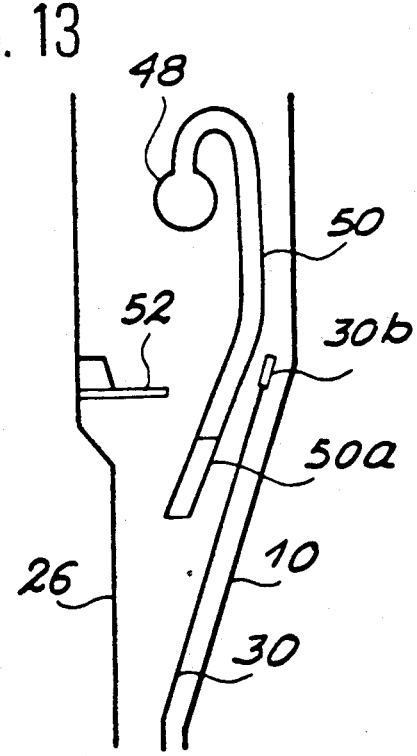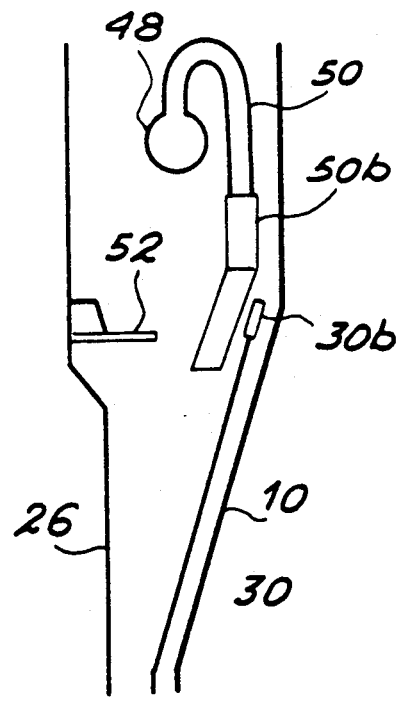

PREHEATING STEAM GENERATOR

FIELD OF THE INVENTION

The invention relates to a preheating steam generator for use in a pressurized water nuclear reactor.

BACKGROUND OF THE INVENTION

The invention more specifically relates to an improvement to the steam generator described in FR-A-2 477 265. The latter describes a steam generator in which the secondary water, generally called feed water, is injected by vertical tubes into the upper, open and flared end of a semicircular feed space. The latter is formed between an inner envelope surrounding the bundle of U-shaped tubes of the generator and a skirt externally duplicating part of said envelope surrounding the branches of the tubes in which the primary water redescends towards the discharge collector for said primary water. Mixed said feed water circulating from top to bottom in the feed space is part of the water, called recirculation water, flowing out of water-steam separators positioned in the upper part of the internal envelope of the exchanger. The rest of the recirculation water flows downwards between the outer envelope of the steam generator and the assembly formed by the inner envelope and the skirt.

This configuration makes it possible to ensure homogeneous preheating of the feed water by the recirculation water within the feed space, prior to the water rising into the inner envelope along the tubes of the group in order to vaporize on contact therewith. For this reason, the feed space is also called an economizer.

In such a steam generator, the supply or feed tubes by which the feed water arrives are generally in the form of an inverted J. Moreover, the skirt approximately follows the contour of the outer envelope of the generator, in such a way that its upper part is flared in order to give the feed space at this level the shape of a funnel. Due to these special shapes of the feed tubes and the feed space and also due to the high speed of the feed water jets passing out of said tubes, eddies can occur in the upper part of the feed space.

These eddies can rise above the feed torus to which are connected the feed tubes and can entrain a large quantity of a mixture formed from saturated recirculation water and feed water. Part of this mixture, at a temperature below the saturation point, then redescends through the space formed between the outer envelope of the generator and the assembly formed by the inner envelope and the skirt. The other part of the mixture, at a temperature above that of the feed water, is injected into the feed space.

The consequence of this phenomenon is to reduce the efficiency of the preheating of the steam generator, which can reduce the pressure therein. The exchange surface of the steam generator is consequently not used in an optimum manner, and consequently its thermal efficiency is reduced.

SUMMARY OF THE INVENTION

The present invention specifically relates to a steam generator with a basic design identical to that described in FR-A-2 477 265, but which has an improved thermal efficiency as a result of improvements preventing the formation of eddies on leaving the feed tubes.

According to the invention, this result is obtained by means of a steam generator having an external envelope of revolution with a vertical axis, which defines an internal space subdivided into a primary lower zone and a secondary upper zone by a plate having horizontal tubes, a vertical partition subdividing the primary lower zone into a primary fluid supply collector and discharge collector, a group of inverted U-tubes placed in the secondary upper zone and connected to the tube plate in such a way that their ends issue respectively into the supply and discharge collectors, an inner envelope covering the group of tubes and having a lower edge remote from the tube plate, a skirt surrounding part of the inner envelope positioned vertically of the discharge collector, in such a way as to define with the inner envelope a secondary water supply space which is open to the top and communicates at its bottom with a space within the inner envelope, said inner space communicating with an upper part of the secondary upper zone by water-steam separators traversing an upper wall of the inner envelope, a secondary water feed device having feed tubes issuing at the top of the feed space and a secondary steam discharge device traversing an upper wall of the inner envelope, characterized in that it comprises return-preventing means preventing the secondary water issuing from the feed tubes from passing out of the feed space above the skirt.

In this steam generator, the return-preventing or non-return means can comprise four optionally combined and different structures.

(a) a plate fixed to the inner envelope facing the skirt and approximately level with an upper edge of the latter, so that at this level there is a reduction of the secondary water feed space passage section;

(b) an extension of each of the feed tubes, issuing at a level significantly below the level of the upper edge of the skirt;

(c) an end section terminating each of the feed tubes and having a larger cross-section than an upstream part of said tubes; and (d) an upward extension of the skirt to a level significantly above the lower end of the tubes.

BRIEF DESCRIPTION OF THE DRAWINGS

Several embodiments of the invention will be described in greater detail hereinafter with reference to FIG. 1 is a vertical sectional view of the lower part of a steam generator on which can be mounted the return-preventing means according to the invention.

FIGS. 7 to 17 are views comparable to FIGS. 3 to 6 illustrating the different possible combinations of the embodiments shown in FIGS. 3 to 6.

DETAILED DESCRIPTION

Figure 1:
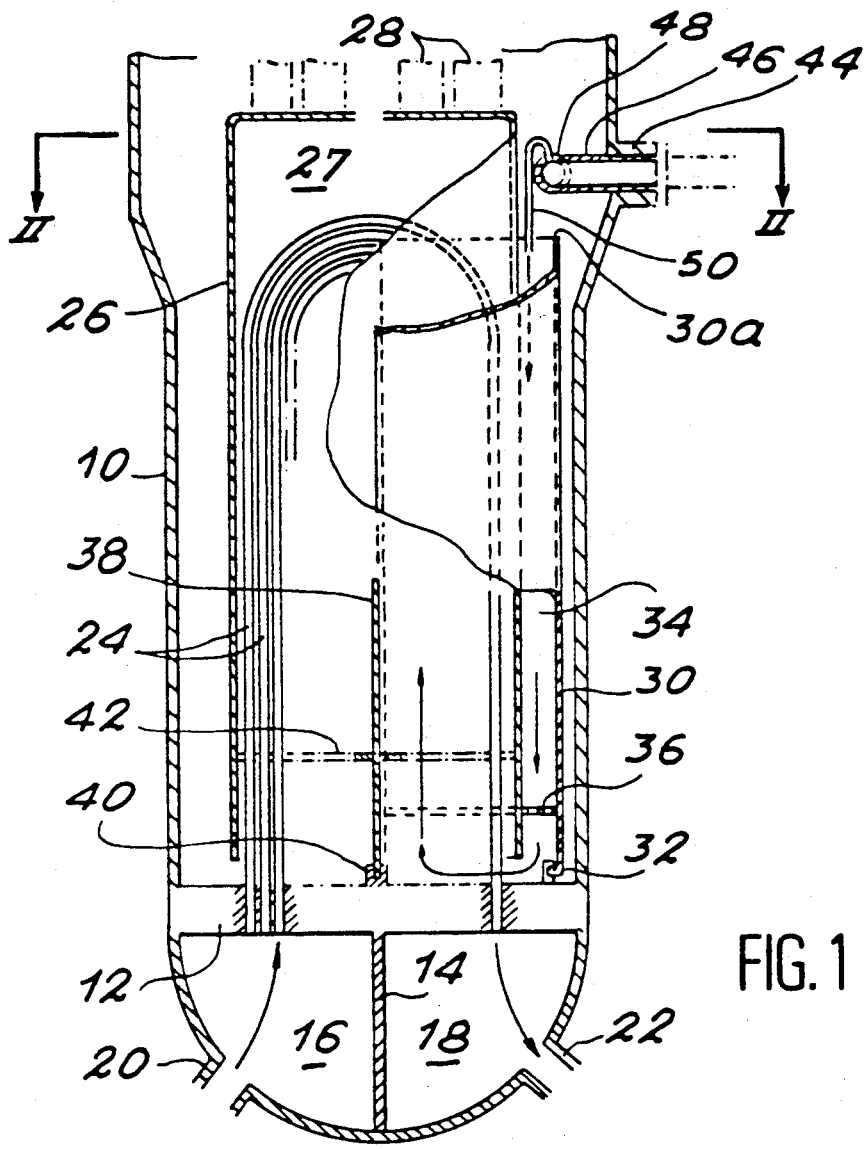
Figure 2:
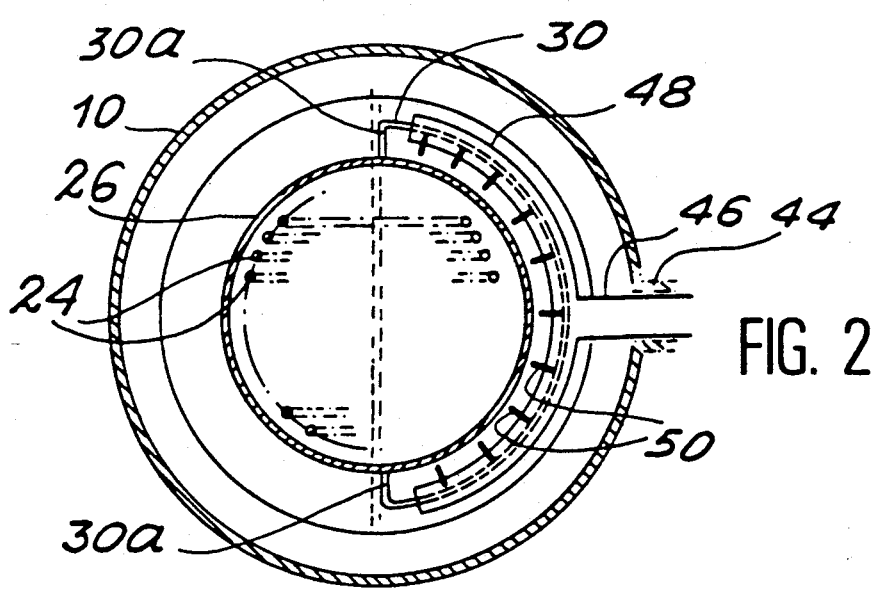
FIG. 2 is a sectional view along line II—II of FIG. 1.

FIGS. 1 and 2 show a vertically axis 1 external envelope of revolution 10 of a steam generator for ensuring the heat transfer between the primary water circuit and the secondary water-steam circuit of a pressurized water nuclear reactor. Envelope 10 defines a closed internal space, which is subdivided into a primary lower zone and a secondary upper zone by a plate 12 having horizontal tubes tightly connected to envelope 10.

A vertical partition 14 subdivides the primary lower zone, conventionally called the water box, into a supply collector 16 and a discharge collector 18 for the water contained in the primary circuit of the reactor. Sockets or small tubes 20 and 22 welded to the outer envelope 10 of the generator respectively connect collectors 16 and 18 to said primary circuit.

A group or bundle of inverted U-tubes 24 is tightly connected to the tube plate 12 in the secondary upper zone defined by the latter, in such a way that the two ends of each of the tubes respectively issue into the supply collector 16 and into the discharge collector 18.

The group of tubes 24 is surrounded and covered by an internal envelope 26 arranged coaxially in external envelope 10. The upper horizontal wall of said internal envelope 26 is traversed by water-steam separators 28 linking space 27 within envelope 26 with the upper part of the secondary upper zone defined within envelope 10 by tube plate 12. The lower edge of the inner envelope 26 is placed at a predetermined distance above tube plate 12, so as to form a passage between the annular space defined between envelopes 10 and 26 and the space 27 within envelope 26.

Moreover, the steam generator according to the invention has a skirt 30 with a semicircular cross-section surrounding that part of the inner envelope 26 positioned vertically of the discharge collector 18, and in which are located the descending branches, called the cold branches of tubes 24. More specifically, skirt 30 terminates at each of its circumferential ends in two radial partitions 30a (FIG. 2), which are tightly connected to inner envelope 26. Skirt 30 extends over most of the height of the inner envelope 26, and its lower edge is connected to tube plate 12 by a semi-tight connection 32.

Thus, between skirt 30 and internal envelope 26 is defined a supply or feed space or economizer 34, which is open to the top and which communicates with space 27 by the passage formed between the lower edge of envelope 26 and tube plate 12. A perforated horizontal plate 36 is connected both to the inner envelope 26 and to the skirt 30 in the lower part of space 34, in order to check the admission flow of feed water into space 27.

In the lower part of space 27 formed in the inner envelope 26, a vertical plate 38 is placed in the extension of partition 14, in order to separate the two branches of the tubes 24. Plate 38 is mounted on tube plate 12 by a semi-tight connection 40 and rises to approximately mid-height in space 27. This plate makes it possible to channel the feed water passing out of space 34 along the cold branches of the bundle of tubes 24, when said water penetrates space 27. It therefore guarantees adequate preheating of the feed water prior to the latter flowing into the complete inner space 27 around tubes 24.

In the lower part of space 27 and on either side of vertical plate 38 is placed a horizontal distribution plate 42, which is traversed by tubes 24 and which is perforated so as to ensure substantially uniform radial distribution of the water outflow speeds from bottom to top in space 27.

The feed water is introduced into the secondary upper zone of the steam generator by a small tube or socket 44 tightly connected to the outer envelope 10, in a larger diameter upper portion of the latter positioned at a level between the upper edge 30a of skirt 30 and the upper partition of inner envelope 26. Socket 44 is extended within the envelope 10 by a duct 46, which issues into an approximately semicircular, toroidal collector 48 positioned above feed space 34 and as illustrated in FIG. 2. Inverted J-shapes tubes 50 are connected at the top of the toroidal collector 48 and descend in an approximately vertical direction, in such a way that their lower end issues at the top of the feed space 34.

For the sake of completeness, it is pointed out that the steam formed in the upper dome of the outer envelope 10 is discharged by a small tube (not shown).

The general operation of the steam generator described hereinbefore relative to FIGS. 1 and 2 is identical to that of the steam generator described in FR-A-2 477 265.

Thus, the water of the primary circuit flows from the supply collector 16 to the discharge collector 18 passing through tubes 24. Simultaneously, feed water admitted by socket 44 is injected to the top of space 34 by feed tubes 50 and descends to the bottom of space 34, before again rising along cold branches of tubes 24 for the preheating thereof. The preheated feed water continues to flow towards the top in space 27 and is progressively distributed over the entire cross-section of the latter until it reaches its vaporization temperature. Thus, the upper part of space 27 is filled with steam, which passes through the water-steam separators 28. The steam passing out of the separators leaves the steam generator by the socket formed for this purpose in the dome of the outer envelope 10. However, the recirculation water passing out of separators 28 redescends into the annular space formed between outer envelope 10 and inner envelope 26, so as to return to contact the tubes 24 in inner space 27. Part of this recirculation water is mixed with the feed water injected by feed tubes 50 at the top of space 34, in order to ensure the preheating thereof.

In practice and as illustrated on a larger scale in FIGS. 3 to 17, the upper part of skirt 30 has an upwardly flared truncated cone shape, so as to remain parallel to the outer envelope 10, which at this level has a truncated cone-shaped portion for connecting a relatively small diameter lower part to a relatively large diameter upper part. Moreover, the inner envelope 26 also has a truncated cone-shaped part 26a of limited height, located at a level just below the upper edge 30a of skirt 30, which has the effect of accentuating the flaring effect of space 34 in its upper part.

In addition, the feed tubes 50 pass between toroidal collector 48 and external envelope 10, in such a way that their lower part must be slightly bent towards the interior of the steam generator in order to issue at the top of space 34.

Due to these special configurations of space 34 and feed tubes 50, and the high flow rate of the feed water circulating in tubes 50, eddies may be formed on leaving the latter. The formation of such eddies is prejudicial to the satisfactory operation of the steam generator, because they can lead to part of the feed water leaving the tubes 50 passing out of the feed space 34. This would have the consequence of significantly reducing the thermal efficiency of the generator.

In order to prevent the formation of such eddies leading to an upward return of the feed water, the invention proposes providing at this point return-preventing means for the feed water. These means can have four different forms which, if appropriate, can be combined with one another, as will become apparent from the following description.

Figure 3:
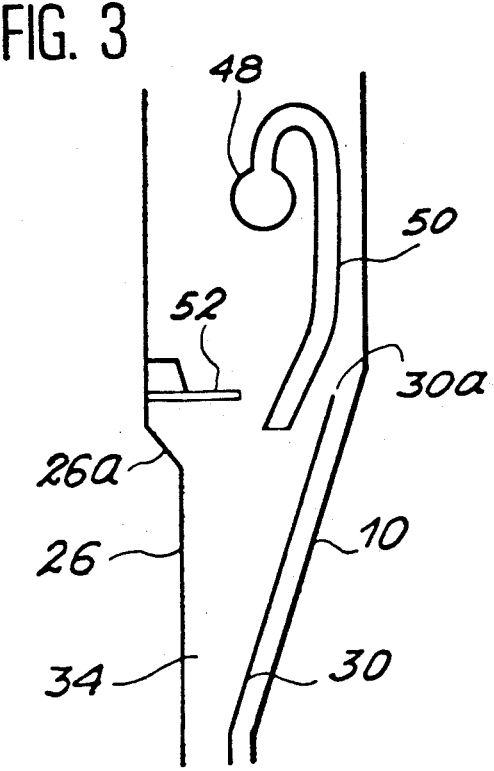
FIGS. 3 to 6 are diagrammatic sectional views showing on a larger scale the feed water supply device to the feed space of the steam generator, in four embodiments of the return-preventing device according to the invention.

FIG. 3 illustrates a first embodiment of the invention, in which the non-return or return-preventing means incorporate a horizontal plate 52 tightly fixed to the inner envelope 26, approximately at the level of the upper edge 30a of skirt 30 and extending over the entire circumferential length of the feed space 34, i.e., approximately in a semicircle. Plate 52 has a uniform width, at most equal to approximately half the width of space 34 level with the upper edge 30a. Thus, plate 52 reduces the passage cross-section of feed space 34 level with edge 30a, which has the effect of preventing the upward return of the feed water.

Figure 4:
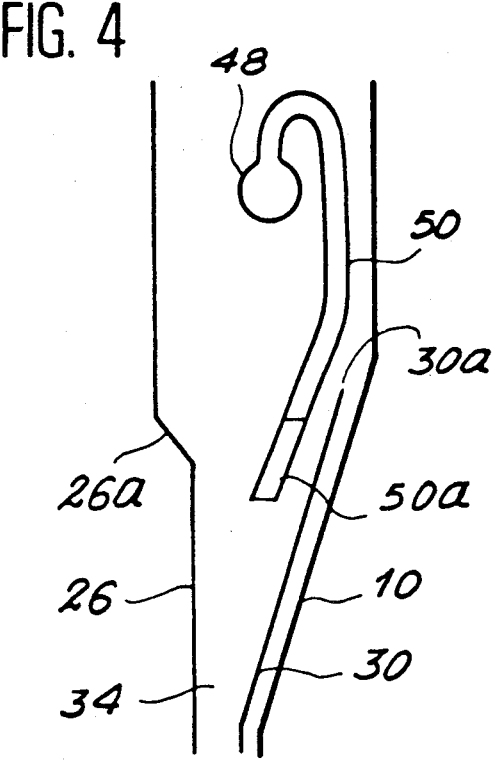

FIG. 4 illustrates a second embodiment of the invention, in which the return-preventing device comprises an extension 50a of each of the tubes 50, which has the effect of making the latter issue at a level well below the upper edge 30a of skirt 30 and also below the truncated cone-shaped part 26a of inner envelope 26. By way of example, extension 50a of each of the tubes 50 may attain a length of approximately 700 mm, the diameter of said extension being identical to that of tubes 50.

This solution favors the flow of feed water at the intake of the uniform cross-section part of space 34 positioned below the upper truncated cone-shaped part of skirt 30. Being in this way channelled well below the upper edge 30a of skirt 30, the feed water flows entirely into space 34, and its return above edge 30a is prevented.

Figure 5:
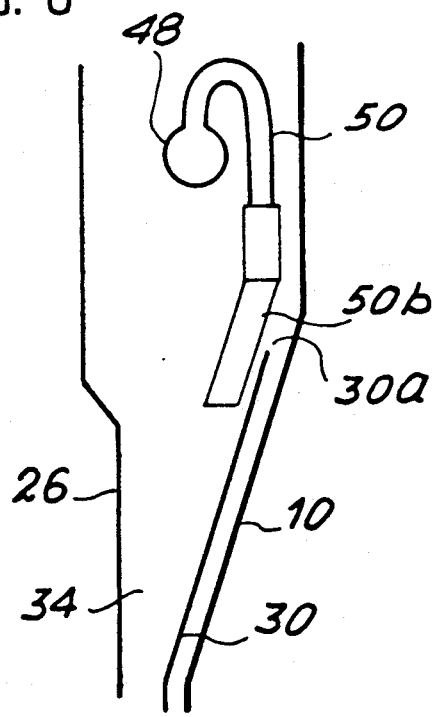

FIG. 5 illustrates a third embodiment of the invention, in which the feed water return-preventing means incorporate a larger diameter, bent tubular section 50b constituting the lower end of each of the feed tubes 50. By way of example, the cross-section of part 50b may be approximately double that of the upstream part of the tubes 50.

This configuration given to the end section of tubes 50 has the effect of reducing, e.g., by a factor of 2, the feed water discharge speeds in space 34. This favors a tranquil flow of the feed water, tending to eliminate eddies and consequently the return of the feed water above the upper edge 30a of skirt 30.

Figure 6:
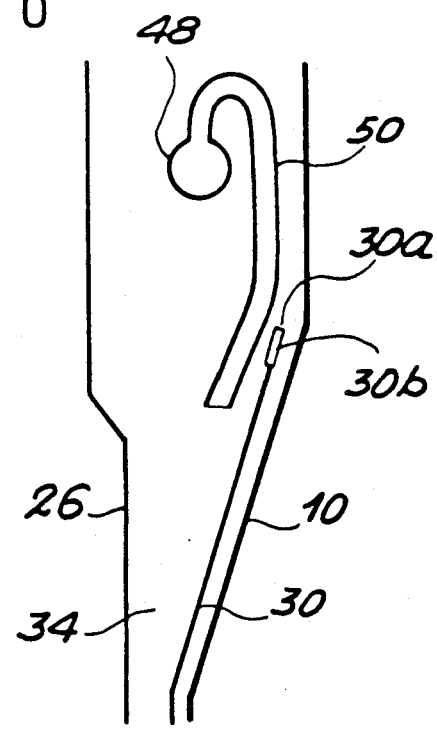

FIG. 6 shows a fourth embodiment of the invention, in which the means preventing the return of the feed water above the upper edge of skirt 30 incorporate an upward extension 30b of said skirt, which has the effect of making the upper edge 30a rise approximately to the level of the junction between the intermediate truncated cone-shaped part and the larger diameter upper part of the outer envelope 10 of the generator.

Like the embodiment FIG. 2, this embodiment has the effect of better channelling the feed water into feed space 34 and of keeping any eddy which may form at the outlet of the tubes at a level below that of the upper edge 30a of skirt 30. Thus, it is possible once again to prevent any feed water return above said upper edge.

As stated hereinbefore, the four aforementioned embodiments described relative to FIGS. 3 to 6 can be advantageously combined with one another in the manner shown in FIGS. 7 to 17.

Thus, FIG. 7 illustrates the combination of the embodiments of FIGS. 4 and 5, in which the feed tubes 50 have both an end section 50b with a larger cross-section than the upstream part of said tubes and an extension 50a of said end part 50b.

FIG. 8 illustrates the combination of the embodiments of FIGS. 3 and 4. Thus, FIG. 8 shows that the steam generator has both a horizontal plate 52 reducing the inlet cross-section of the feed space 34 and extensions 50a of feed tubes 50.

FIG. 9 shows the combination of the embodiments of FIGS. 3 and 5, i.e., the steam generator has both the horizontal plate 52 and each of the tubes 50 has a terminal section with a larger cross-section 50b.

FIG. 10 illustrates the combination of the embodiments of FIGS. 3 and 6, in which the steam generator comprises plate 52 and skirt 30 has an upward extension 30b.

In FIG. 11, skirt 30 also has the upward extension 30b and the tubes 50 have an upward extension 50a, i.e., the embodiments of FIGS. 4 and 6 are combined.

Finally, FIG. 12 illustrates the case where the return of feed water above the upper edge 30a of skirt 30 is prevented both by equipping the latter with an upward extension 30b and by providing on each of the tubes 50 with a larger cross-section end section 50b, in accordance with the variants of FIGS. 5 and 6.

FIGS. 13 to 16 show three of the variants of FIGS. 3 to 6 being combined in order to prevent the feed water returning above the upper edge 30a of skirt 30.

In the case of FIG. 13, the variants of FIGS. 3, 4 and 6 are combined, i.e., each of the tubes 50 has an upward extension 50a, skirt 30 has an upward extension 30b and a plate 52 is fixed to the inner envelope 26.

In FIG. 14, the embodiments of FIGS. 3, 5 and 6 are combined, i.e., each of the tubes 50 has a larger cross-section end section 50b, skirt 30 has an upward extension 30b and the inner envelope 26 supports a horizontal plate 52.

Figure 15:
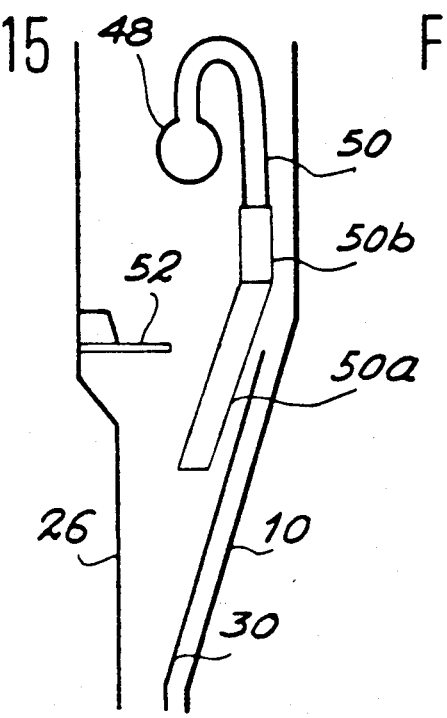

FIG. 15 shows the combination of the embodiments of FIGS. 3, 4 and 5, i.e., each of the tubes 50 has both a downward extension 50a and a larger cross-section end section 50b, to which belongs member 50a. In addition, the inner envelope 26 here again supports a horizontal plate 52.

Figure 16:
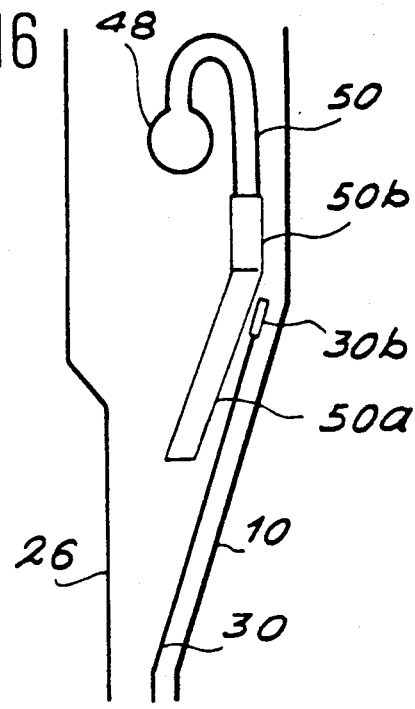

FIG. 16 shows the combination of the embodiments of FIGS. 4, 5 and 6, i.e., compared with FIG. 15, plate 52 is eliminated and skirt 30 has an upward extension 30b.

Figure 17:
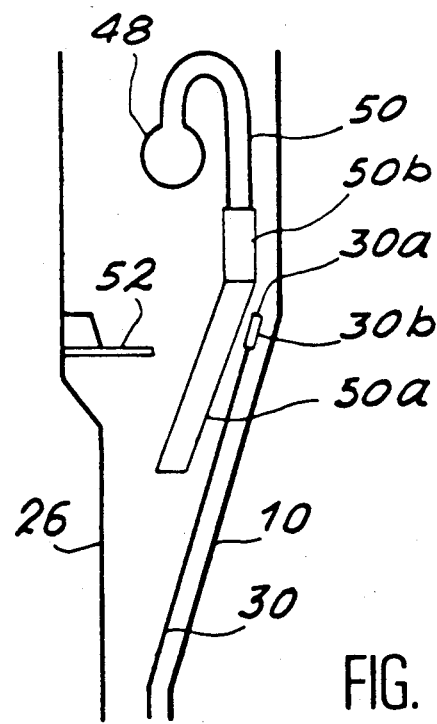

FIG. 17 illustrates the combination of the four embodiments of FIGS. 3 to 6, i.e., each of the tubes 50 has both an extension 50a and a larger cross-section section 50b to which said extension belongs, skirt 30 has an upward extension 30b and inner envelope 26 supports a horizontal plate 52.

Figure 18:
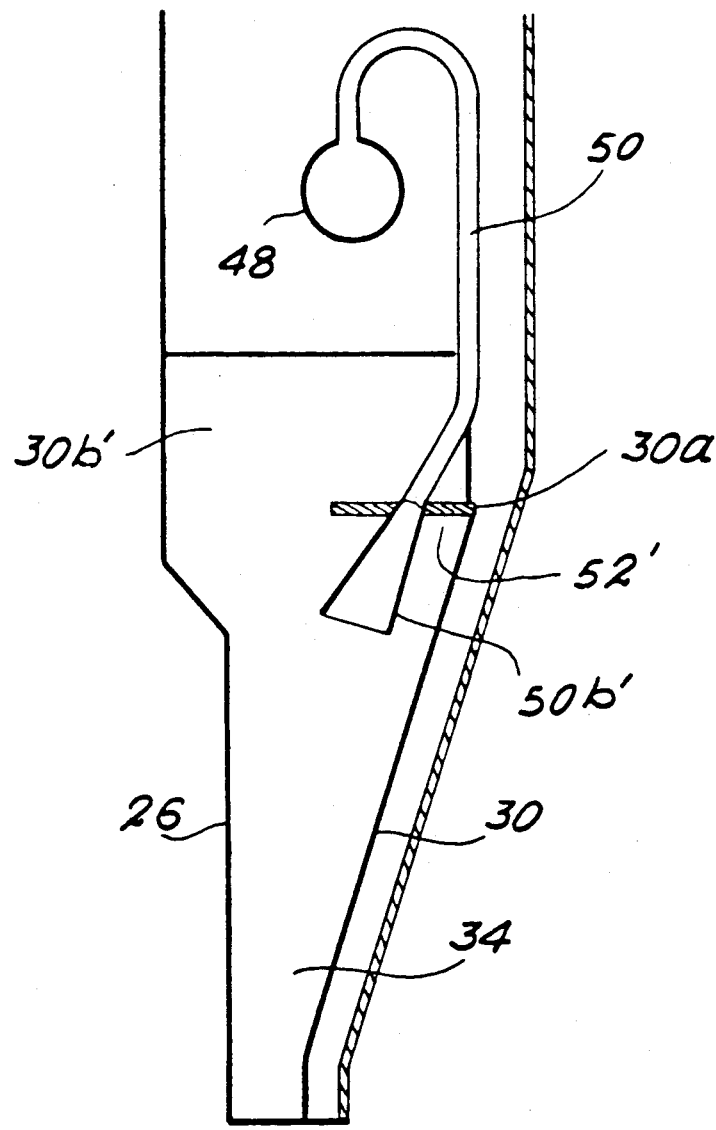
FIG. 18 is a view comparable to FIGS. 3 to 17 illustrating the combination of the embodiments of FIGS. 3, 5 and 6, in the case where certain modifications are made to these embodiments.

FIG. 18 shows a further modification to the combination of the embodiments of FIGS. 3, 5 and 6 described relative to FIG. 14. Thus, in the case of FIG. 18, a horizontal plate 52' reduces the passage cross-section of feed space 34 level with the upper edge 30a of skirt 30, the lower end of each of the feed tubes 30 has a larger diameter section 50b' and the upper edge of skirt 30a has an upward extension 30b'. However, these three elements are produced in a manner different from that described hereinbefore.

Thus, instead of being fixed to the inner envelope 26, the horizontal plate 52' is tightly fixed to the upper edge 30a of skirt 30. Moreover, it extends over the entire circumferential length of feed space 34, i.e., approximately over a semicircle. Plate 52' has a uniform width, at the most equal to approximately half the width of space 34 level with upper edge 30a.

As in the first embodiment, plate 52' reduces the passage cross-section of feed space 34 at edge 30a, which has the effect of preventing the upward return of the feed water. Tubes 50 descend lower than plate 52' and tightly traverse the latter.

The larger diameter section 50b' terminating each of the tubes 50 is located immediately below plate 52' and has in this case a conical shape passing from a circular section with the diameter of the upstream tubes 50 to an elliptical section, which can be four times the circular section.

The regular increase in the diameter of tubes 50 up to the end thereof and the passage to an elliptical cross-section has the effect of very significantly reducing the upward rise of feed water into space 34.

Due to the attachment of horizontal plate 52' to skirt 30, the upward extension 30b' of the latter is in this case limited to a simple extension of the radial parts of skirt 30, by which the latter is connected to the inner envelope 26. Extension 30b' is tightly welded to said latter envelope and advantageously rises to a level slightly above that of the junction between the intermediate truncated cone-shaped part and the upper, larger diameter part of the outer envelope 10 of the steam generator.

As illustrated in FIG. 18, the three embodiments of FIGS. 3, 5 and 6 modified in this way are advantageously combined.

As a result of the various embodiments of the invention, whether combined or not, the return of feed water above the upper edge of skirt 30 is prevented, so that the thermal efficiency of the generator is increased.

The invention is applicable to any stem generator in which the feed water supplies an economizer by approximately vertical tubes.

We claim:

1. Steam generator for a pressurized water reactor having an external envelope with a vertical axis of revolution, said envelope defining an internal space subdivided into a primary lower zone and a secondary upper zone by a plate having horizontal tubes, a vertical partition subdividing the primary lower zone into a primary fluid supply collector and a discharge collector, a group of inverted U-tubes located in the secondary upper zone and connected to the tube plate in such a way that ends of the U-tubes issue respectively into the supply and discharge collectors, an inner envelope covering the group of tubes and having a lower edge remote from the tube plate, a skirt surrounding part of the inner envelope positioned vertically of the discharge collector in such a way as to define with the inner envelope a secondary water supply space which is open to the top and communicates at its bottom with a space within the inner envelope, said inner space communicating with an upper part of the secondary upper zone by water-steam separators traversing an upper wall of the inner envelope, a secondary water feed device having feed tubes issuing at the top of the feed space and a secondary steam discharge device traversing an upper wall of the inner envelope, wherein said steam generator comprises return-preventing means preventing secondary water issuing from the feed tubes from passing out of the feed space above the skirt, said return-preventing means comprising a plate mounted substantially level with an upper edge of said skirt so as to reduce at this level a cross-section of a passage for the secondary water supply space.

2. Steam generator according to claim 1, wherein the plate seals at most approximately half the passage cross-section at the upper edge o the skirt.

3. Steam generator according to claim 1 or 2, wherein the plate is fixed to the inner envelope facing skirt.

4. Steam generator according to claim 1, wherein the plate is fixed to the skirt facing the inner envelope and is tightly traversed by the feed tubes.

5. Steam generator according to claim 1, wherein the return-preventing means have an extension for each of the feed tubes issuing at a level substantially below the level of the upper edge of the skirt.

6. Steam generator according to claim 1, wherein the return-preventing means incorporate an end section terminating each of the feed tubes and having a larger cross-section than an upstream part of said tubes.

7. Steam generator according to claim 6, wherein the cross section of the end sections is approximately double that of the upstream parts of the tubes.

8. Steam generator according to claim 6, wherein the end sections have a conical shape and pass from a circular cross-section to an elliptical cross-section.

9. Steam generator according to claim 8, wherein the elliptical cross-section is approximately equal to four times the circular cross-section.

10. Steam generator according to claim 1, wherein the return preventing means incorporate an upward extension of the skirt to a level substantially above the lower end of the tubes.

11. Steam generator according to claim 10, wherein the skirt has two radial parts by which it is connected to the inner envelope, only these radial parts having an extension.

* * * * *